(12) United States Patent
Caratge

(10) Patent No.: US 10,865,800 B2
(45) Date of Patent: Dec. 15, 2020

(54) BLEED VALVE WITH REGULATED OPENING

(71) Applicant: SAFRAN AIRCRAFT ENGINES, Paris (FR)

(72) Inventor: Antoine Marie Georges Caratge, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 56 days.

(21) Appl. No.: 16/374,628

(22) Filed: Apr. 3, 2019

(65) Prior Publication Data

US 2019/0309762 A1    Oct. 10, 2019

(30) Foreign Application Priority Data

Apr. 5, 2018 (FR) ...................... 18 52969

(51) Int. Cl.
*F04D 27/02* (2006.01)
*F02C 6/08* (2006.01)
(Continued)

(52) U.S. Cl.
CPC ....... *F04D 27/0215* (2013.01); *F01D 17/105* (2013.01); *F02C 6/08* (2013.01); *F02K 3/075* (2013.01); *F04D 27/023* (2013.01)

(58) Field of Classification Search
CPC .... F04D 27/015; F04D 27/023; F01D 17/105; F02K 3/075
See application file for complete search history.

(56) References Cited

U.S. PATENT DOCUMENTS 2,978,166 A * 4/1961 Hahn .................. F04D 27/0223
                                                        415/17
3,073,511 A * 1/1963 Knight ................. F04D 27/023
                                                        415/17
(Continued)

FOREIGN PATENT DOCUMENTS

FR    2982319 A1    5/2013
FR    3036137 A1    11/2016

OTHER PUBLICATIONS

Preliminary Research Report and Written Opinion received for French Application No. 1852969, dated Dec. 3, 2018, 7 pages (1 page of French Translation Cover Sheet and 6 pages of original document).

*Primary Examiner* — Kevin R Barss
(74) *Attorney, Agent, or Firm* — Womble Bond Dickinson (US) LLP

(57) ABSTRACT

Controller, control actuator and bleed valve including a first chamber for the circulation of a discharge air stream when the valve is open and preventing it when the valve is closed, an inner housing, in which a mobile blocking unit is moved between a position for opening and a position for closing the valve, this unit delimiting, in the inner housing, two chambers, the second chamber including a mechanism for returning the blocking unit to the open position, and the third chamber, being used to be in fluidic connection with the control actuator in order to actuate the blocking unit against the return mechanism, the three chambers being isolated in a sealed manner from one another by way of the blocking unit. The device includes a regulation valve.

7 Claims, 2 Drawing Sheets

(51) Int. Cl.
    *F02K 3/075*     (2006.01)
    *F01D 17/10*     (2006.01)

(56) References Cited

U.S. PATENT DOCUMENTS

| | | | | |
|---|---|---|---|---|
| 3,469,771 | A * | 9/1969 | Wilhelm | F04D 27/023 |
| | | | | 415/43 |
| 3,994,617 | A * | 11/1976 | McCombs | F04D 27/0223 |
| | | | | 415/28 |
| 4,251,985 | A * | 2/1981 | Sullivan | F02C 9/18 |
| | | | | 415/27 |
| 4,574,585 | A * | 3/1986 | Conn | F01D 17/08 |
| | | | | 415/27 |
| 8,661,833 | B2 * | 3/2014 | Army | B64D 13/08 |
| | | | | 60/785 |
| 9,297,461 | B2 * | 3/2016 | Thompson | F16K 11/044 |
| 9,400,060 | B2 * | 7/2016 | Garvey | G05D 16/166 |
| 10,267,430 | B2 * | 4/2019 | Simpson | F01D 17/105 |
| 2010/0083667 | A1 | 4/2010 | Franconi | |
| 2013/0115055 | A1 | 5/2013 | Mottet et al. | |
| 2016/0376913 | A1 * | 12/2016 | Marocchini | F04D 27/0223 |
| | | | | 137/511 |
| 2017/0067578 | A1 * | 3/2017 | Hoffman | F01D 21/003 |
| 2018/0142626 | A1 | 5/2018 | Joudareff et al. | |

\* cited by examiner

BLEED VALVE WITH REGULATED OPENING

TECHNICAL FIELD

The present invention relates to a bleeding device for a turbine engine comprising a bleed valve, in particular with a regulated opening.

STATE OF THE ART

A bypass turbine engine comprises a flow path for a primary stream (or hot stream) and a flow path for a secondary stream (or cold stream). It is known to equip such a turbine engine with bleed valves, sometimes called VBVs (Variable Bleed Valves) or called air valves (as they open or close air channels). These are conventionally valves of the all-or-nothing type (closed or open).

Conventionally and in a manner well known per se, and as illustrated in FIG. 1, which is a schematic, axial cross-sectional view of a twin spool turbofan 10, such a turbofan generally comprises, from upstream to downstream along the flow direction of the gases, a low-pressure compressor 12, a high-pressure compressor 14 (HP core), a combustion chamber 16, a high-pressure turbine 18 and a low-pressure turbine 20 which define a flow path for a primary gas stream 22 and form the central compartment 15 (shown in FIG. 1) ("core zone") of the turbofan. In the case of bypass turbofans, the turbofan further comprises a fan 24 surrounded by a nacelle 26 to generate a secondary stream 28 passing through a secondary annular flow path, defined between the nacelle 26 and the central compartment 15 of the turbofan.

The pressure PI in the primary stream flow path is greater than the pressure PII in the secondary stream flow path.

The bleed valves 30 are conventionally located in the central compartment ("core zone") of the turbine engine, more specifically in the proximity of a compressor, and are intended to regulate the air inlet flow in the primary flow path in order, in particular, to limit the risks of surge of the turbine engine compressor by making it possible for the evacuation or the bleeding of an air stream towards the secondary flow path.

Surge is an aerodynamic phenomenon, well known by any person skilled in the art, occurring in a compressor: when the pressure difference between the inlet and the outlet of the compressor is too high, instabilities (called rotating stalls) appear at the level of the blades of the compressor. If this rotating stall phenomenon is too high, the gas stream generated in the compressor makes it no longer possible to push said gas in the correct direction, and the "high-pressure" portion of the compressor (the outlet) is emptied in the "low-pressure" portion thereof (the inlet). In certain extreme cases, an inversion of the flow direction can be observed.

The surge phenomenon reduces the performance of the compressors and can also be damaging for the blades of the compressor.

Surge is one of the most serious problems that a pilot can face, as it generally occurs on take-off of the aircraft.

Moreover, in case of accidental penetration of water in the primary flow path, in particular in the form of rain or of hail, or also of various debris, which is likely to damage the functioning of the turbine engine, these valves make it possible to recover this water or this debris, which is then centrifuged and transported up to the secondary flow path.

Thus, each aeronautical engine is equipped with systems for the discharge of the compressor in the form of valves, conventionally actuated by hydraulic or pneumatic actuators.

As can be seen in FIG. 2, a conventional bleed valve 30, comprises a central piston 32 making it possible, or not, to connect the two primary and secondary flow paths 22, 28. The valve 30 also comprises a side conduit 34 connected to a controller (not represented) making it possible for the actuation of the valve 30 by modifying the pressure balances within the valve 30, as will be described below. The valve 30 is kept closed thanks to the pressurised air 36 (called servo pressure or "control air") sent via the channel 34. The disadvantage of valves 30 known from the state of the art is that they are most often all-or-nothing valves. Yet, for certain applications, regulation of the air flow passing into the bleed valve can improve engine operability and therefore performance. This is particularly true for engines with a turboprop architecture.

Indeed, modulation of the bleed flow of the compressor through a position-regulated valve, gives significant performance gains, with respect to open/closed systems achieved by on/off valves. However, position-regulated valves are most often butterfly (or ball) type valves comprising a hydraulic actuator (functioning, for example, with a fuel) and typically form a cumbersome item of equipment. Document FR 3 036 137 A1 illustrates, for example, such a valve. Butterfly type valves moreover have several problems:

Firstly, it is known that the carbon ring(s) ensuring sealing around the butterfly is/are worn out in contact with solid pollutants (formation of small cavities). These solid pollutants can also get stuck in the recess thereof (the recess therefore can no longer expand to block the escape routes) or also get stuck between the carbon ring and the inner wall of the valve, thus preventing the valve from functioning.

Secondly, butterfly type valves have significant air leaks at the seal level s when they are closed. These leaks adversely impact the engine performance and, moreover, accelerate the wear of these seals, which induces a premature degradation of the functional characteristics of the valves. The typical "leak-proof" system of a butterfly type valve is thus relatively complex.

Thirdly, as stated above, a butterfly valve has a very complex design. Typically, the shaft of the butterfly must be held in place by two ball bearings (or carbon bearings), which are expensive and require a careful assembly. The opening/closing of the butterfly valve is driven by a set of connecting rods (transforming the linear movement of the actuator into an angular movement) which can get stuck or is subject to wear.

The present invention proposes a solution to these different problems.

DESCRIPTION OF THE INVENTION

To this end, the present invention proposes a discharge device for a turbine engine comprising:
  a controller,
  an actuator for controlling air distribution connected to the controller, comprising a body comprising an inner cavity connected to an air inlet port and an air outlet port, and comprising a mobile member arranged in said cavity between an opening position of the air outlet port and a closing position of the air outlet port,
  a bleed valve comprising:
    a first chamber intended to make the circulation of a bleed air stream possible when the valve is in the open position and to prevent the circulation of the bleed air stream when the valve is in the closed position, an inner housing in which a first blocking means is mobile between the open position of the valve and the closed position of the valve, and an air outlet, the first blocking means delimiting, in the inner housing, a second chamber and a third chamber, the second chamber called upper inner chamber, comprising return means for returning the first blocking means to the open position of the valve, and the third chamber, called lower inner chamber, being configured so as to be fluidly connected to the control actuator, in order to actuate the first blocking means against the return means, the three chambers being isolated in a sealed manner from one another by way of the first blocking means, the device being characterised in that it comprises a regulation valve comprising:

an inner space connected to the air outlet port of the control actuator, a leakage orifice, and a second blocking means, mobile between a sealed closing position of said leakage orifice and an adjustable position for opening said leakage orifice, so as to create a determined leak flow and to consequently adjust the pressure within the inner space.

The device according to the invention can comprise one or more of the following characteristics, taken individually from one another or combined with one another:

the second mobile blocking means of the regulation valve can be configured to be actuated by electrical means, the electrical means can comprise at least one electrical coil, the bleed device can be configured such that the section of the leakage orifice is directly proportional to an activation current of the coil, the inner space can be connected to the air inlet port of the control actuator via a fluidic communication conduit provided with a calibrated orifice, so as to limit the air flow going from the air inlet port to the inner space, the control actuator, the electropneumatic controller and the regulation valve can form a single-block unit.

The present invention also relates to a turbine engine comprising a discharge device such as described above.

DESCRIPTION OF THE FIGURES

The invention will be best understood, and other details, characteristics and advantages of the invention will appear more clearly upon reading the following description made as a non-limiting example, and with reference to the appended drawings, in which.

DETAILED DESCRIPTION

Figure 1:
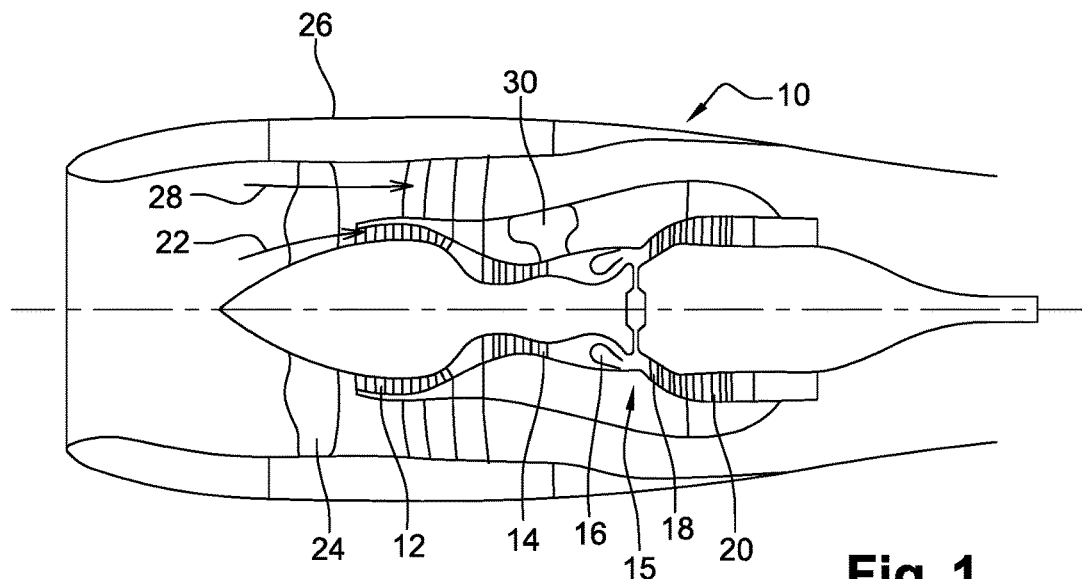
FIG. 1 is a schematic, axial, cross-sectional view of a twin spool turbofan.
Figure 2:
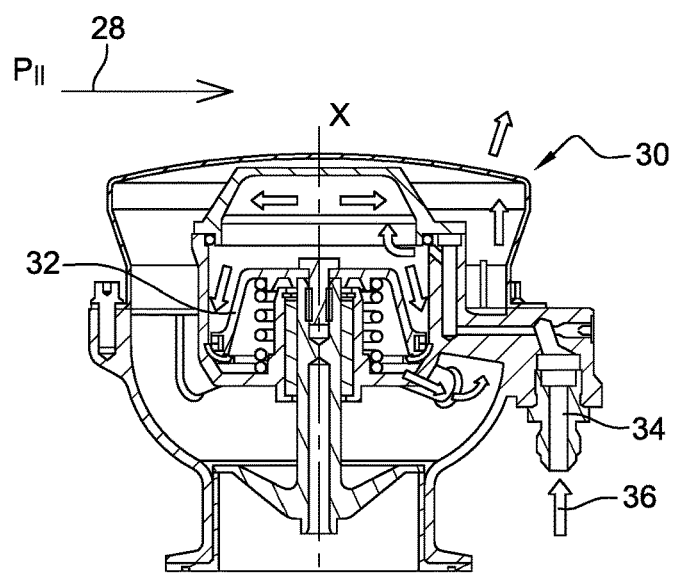
FIG. 2 is an axial, cross-sectional view of a bleed valve according to the state of the art.
Figure 3:
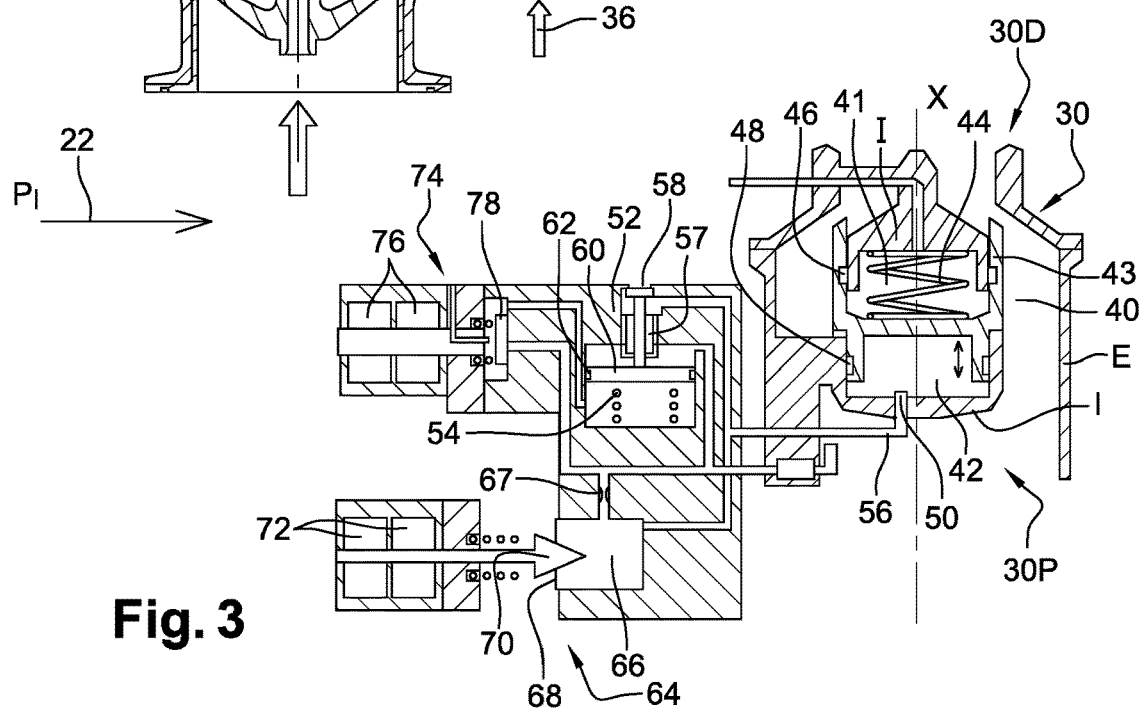
FIG. 3 is a schematic, axial, cross-sectional view of a device according to the invention, when the turbine engine is switched off.

As can be seen in FIG. 3, the device according to the invention in particular comprises a "poppet"-type bleed valve 30.

The valve 30 has a general cylindrical shape of revolution axis X and is intended to extend radially between the circulation flow path of the primary stream 22 (wherein there is a pressure PI) and the circulation flow path of the secondary stream 28 (wherein there is a pressure PII). The pressure PII is less than the pressure PI.

The valve 30 thus has a distal end 30D opening into the secondary flow path forming a bleed air outlet and a proximal end 30P opening into the primary flow path (or cavity that opens into the primary flow path) forming an air inlet. When the valve 30 is open (see FIG. 6, for example), the distal end 30D and the proximal end 30P are fluidly connected: the circulation flow paths of the two primary and secondary streams 22, 28 are therefore also fluidly connected and the bleed air leaves the primary flow path to go into the secondary flow path due to the pressure difference (since PII<PI). When the valve 30 is closed (see FIG. 4), the two flow paths are isolated.

The valve 30 comprises three coaxial chambers:

a first chamber 40 (outer annular chamber), delimited by an outer wall E of the valve 30 and by an inner annular wall I, and passed through by the air stream coming from the primary flow path towards the secondary path when the valve 30 is open, a second chamber 41 (upper inner chamber), and a third chamber 42 (lower inner chamber), There are therefore two inner chambers: the upper chamber 41 and the lower chamber 42. The lower chamber 42 is connected to the air outlet 50 of the control actuator 52. The upper inner chamber 41 is connected to the ambient pressure which is the surrounding pressure of the valve. The two inner chambers 41, 42 are delimited by the inner wall I cooperating with a first mobile blocking means 43, here a piston. The three chambers 40, 41, 42 are isolated from one another by guide rings 46 and 48, acting as seals. The first purpose of these rings 46, 48 is to cause the first mobile blocking means 43 to slide.

The first blocking means 43 is mobile in translation along the axis X between an opening position of the valve 30 and a closing position of the valve 30. Thus, when the valve 30 is open, the first mobile blocking means 43 only cooperates with the inner wall I of the valve 30. When the valve 30 is closed (i.e. the proximal and distal ends 30P, 30D are fluidly connected), the first mobile blocking means 43 cooperates with the inner wall I and the outer wall E of the valve 30.

The upper inner chamber 41 moreover comprises return means 44 (here a spring) of the first mobile blocking means 43 in the open position of the valve 30.

The first mobile blocking means 43 is here a piston having, in the vertical section (along X), a general H-shape. The piston thus comprises a transversal wall connected to two cylindrical walls. Each cylindrical wall extends on either side of the transversal wall.

In order to ensure the sealed isolation of the two chambers 40, 42, the first mobile blocking means 43 is provided, on the cylindrical walls thereof, on either side of the transversal wall, with two guide rings 46 and 48, a first ring (distal ring) 46 and a second ring (proximal ring) 48, acting as seals. When the valve is closed, the sealing is obtained by the fact that the pressure on either side of the rings 46, 48 is identical. Each ring 46, 48 cooperates with the inner wall and thus defines the inner chamber 40. More specifically, the first ring 46 cooperates with an outer face of this inner wall and the second ring 48 cooperates with an inner face of this inner wall.

The closing of the valve 30 is achieved by a translation of the first mobile blocking means 43 towards the distal end 30D of the valve 30, opposing the return force of the return means (here the spring 44), itself housed in the upper inner chamber 41. The return means 44 thus cooperates with the core of the first mobile blocking means 43.

The lower inner chamber 42 further comprises an air outlet 50, separate from the proximal and distal ends 30P, 30D of the valve 30 connected to the ambient pressure, i.e. the surrounding pressure of the valve 30.

Figure 4:
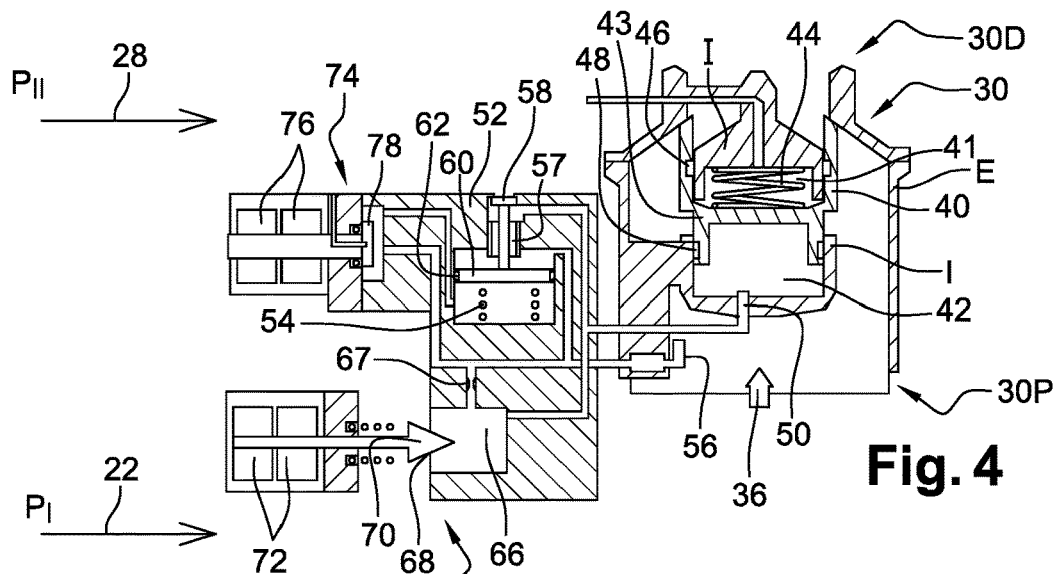
FIGS. 4, 5 and 6 are schematic, longitudinal, cross-sectional views of a device according to the invention respectively with the bleed valve in the closed position, in the intermediate position and in the open position.
Figure 5:
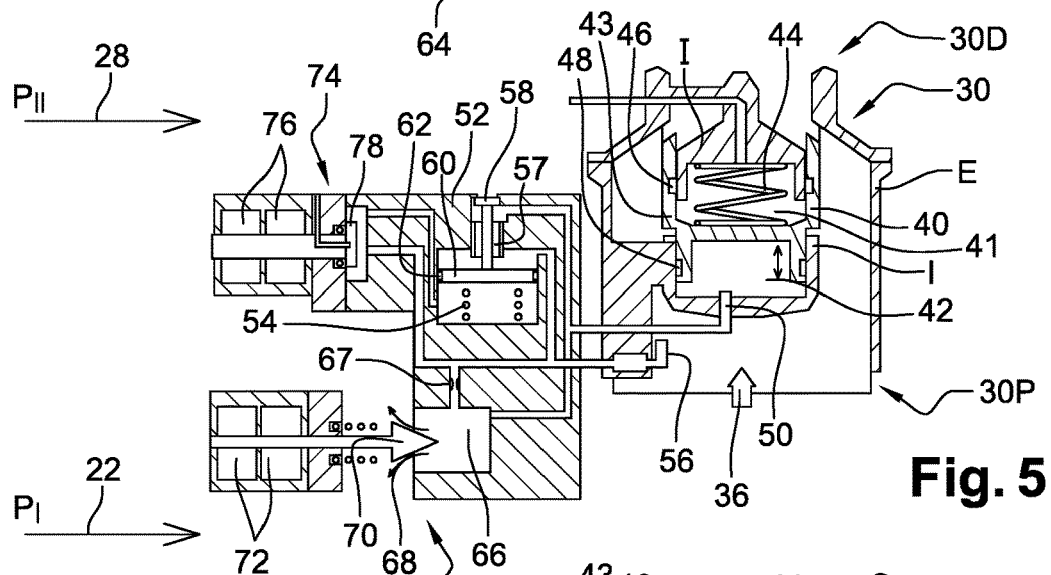
Figure 6:
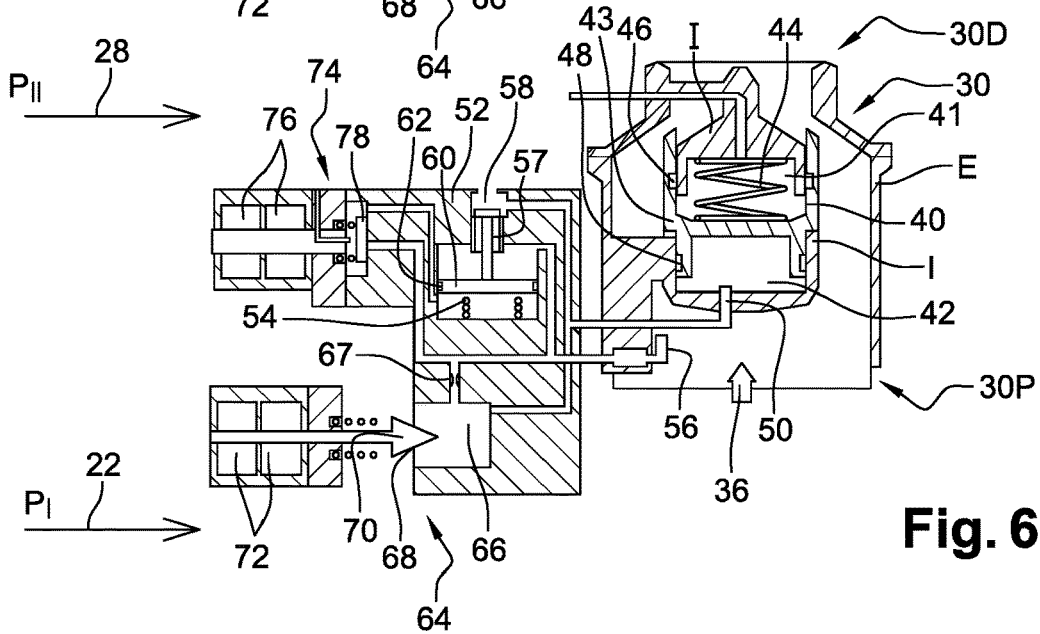

The device moreover comprises a pneumatic actuator 52. The pneumatic actuator 52 comprises a body comprising an inner cavity 54 connected to an air inlet port 56 and to an air outlet port 58. The actuator 52 further comprises a mobile member 60, here a piston. The mobile member 60 is mobile in the cavity 54 between an opening position of the air outlet port 58 and a closing position of the air outlet port 58. The mobile member 60 moreover comprises an annular guide ring acting as an annular seal 62 cooperating with an inner face of the wall of the cavity 54. As can be seen in FIGS. 4, 5 and 6, the device comprises a rod between the mobile member 60 and the poppet valve opening/closing the air outlet 58, and this rod slides in a bearing 57, typically a carbon bearing.

The air inlet port 56 is intended to continuously receive the pressurised air (the control air) 36. This air can come from, as illustrated in FIG. 4, 5 or 6, the outer chamber 40 which, when the engine is switched on, is filled with air coming from the primary flow path and which is therefore permanently at PI. This control air 36 can however come from an external source.

The air outlet 50 of the lower inner chamber 42 of the valve 30 is connected to the air outlet port 58 of the actuator 52 and the two air outlets 50, 58 can be fluidly connected by moving the mobile member 60 which thus opens the poppet valve.

The device according to the invention also comprises a regulation valve 64 comprising an inner space 66 connected, on the one hand, to the air inlet port 56 of the actuator 52 and on the other hand, to the air outlet 50 of the lower inner chamber 42 of the valve 30. The inner space 66 of the regulation valve 64 is therefore also connected to the air outlet port 58 of the actuator 52 via fluidic connection conduits.

The conduit connecting the inner space 66 to the air inlet 56 is provided with a calibrated orifice 67 limiting the air stream arriving in the inner space 66 and thus making it possible for a decrease of the pressure in the inner space 66.

The regulation valve 64 moreover comprises a leakage orifice 68 which can be more or less open or closed. The opening and the closing of the leakage orifice 68 is ensured by a second mobile blocking means 70 (here a punch), between a sealed closing position of said leakage orifice 68 and an adjustable opening position of said leakage orifice 68. The second mobile blocking means 70 is here linked to two electrical coils 72 so as to form a regulation solenoid valve 64 controlled by an electrical control member, not represented.

The actuator 52 is actuated by an electropneumatic controller 74. In the case of the present invention, the actuator 52 and the controller 74 form a single-block device. The controller 74 comprises two coils 76 and a mobile cup 78 so as to form a solenoid valve. This solenoid valve makes it possible, conventionally and in a known manner, to move the mobile member 60 of the actuator 52 by modifying pressure balances in the cavity 54.

In FIG. 4, it is seen that when the air outlet port 58 of the actuator 52 is closed by the mobile member 60 held in the position for closing the outlet port 58 by the controller 74, the control air 36 coming from the outer chamber 40 the valve 30 supplies the inner space 66 of the regulation valve 64 and this, without losing pressure during the passage of the calibrated orifice 67, as when the valve 30 is in the closed position, there is no control air leakage. Then, it supplies the lower inner chamber 42 of the valve 30. This holds the first mobile blocking means 43 in the closing position of the valve 30. In this configuration, the electrical coils 72 of the regulation valve 64 are in standby, i.e. there is no current passing through them. This limits the heating when the position regulation of the first mobile blocking means 43 of the valve 30 is not necessary (like for example, during cruise-mode flight phases).

This position regulation is done thanks to the leakage orifice 68. Indeed, by activating the electrical coils 72 of the regulation valve 64, movement of the second mobile blocking means 70 and partially opening the leakage orifice 68 are made possible, as can be seen in FIG. 5.

Thus, when the leakage orifice 68 is open, air escapes from the inner space 66 and, according to the degree of opening of the leakage orifice 68, a determined leakage flow is created, which makes it possible to adjust the pressure within the inner space 66 of the regulation valve 64 and, in particular, to create a low pressure, this thanks to the calibrated orifice 67 upstream from the inner space 66, which blocks the leakage flow. As the inner space 66 is connected to the air outlet 50 of the lower inner chamber 42 of the valve 30, this low pressure creates a suction effect in the lower inner chamber 42 and the pressure within the lower inner chamber 42 decreases. The return means 44 meeting a reduced opposing force (the pressure in the upper chamber 41 always being constant, as it is equal to the ambient pressure), it is expanded a little, and induces a determined sliding (along X) of the first mobile blocking means 43. This results in a determined opening of the valve 30 and therefore in a determined air passage between two primary and secondary stream 22, 28 circulation flow paths.

The more or less large opening of the leakage orifice 68 of the inner space 66 of the regulation valve 64 depends on the current passing through the coils 72.

When, as can be seen in FIG. 6, the coils 76 of the controller 74 are not actuated, the mobile cup 78 induces a movement of the mobile member 60 of the actuator 52. Thus, the air outlet 50 of the lower inner chamber 42 is fluidly connected to the air outlet port 58 of the actuator 52 and the pressure inside the lower inner chamber 42 falls substantially. The return means 44 no longer meets any opposing force and fully expands. The first mobile blocking means 43 undergoes a translational movement (along the axis X) towards the proximal end of the valve 30, inducing the opening of the valve 30. Air can fully circulate between the two primary and secondary stream 22, 28 circulation flow paths.

For the regulation valve 64 to take effect, it is necessary that the controller 74 is active, i.e. at least one of the coils thereof 76 is passed through by an electrical current, as can be seen in FIG. 5, for example.

The deactivation of the controller 74 makes it possible for a complete and quick opening of the valve 30.

When the turbine engine is switched off (see FIG. 3), the leakage orifice 68 is closed, so as to avoid the introduction of dust in the inner space 66.

Through the position of the rings 46, 48 on the outer and inner faces of the inner wall, each ring (seal) 46, 48 has the same pressure on either side when the valve 30 is closed, and the leakage flows around these rings 46, 48 are suppressed. There are no control air leakages, as:

the ambient pressure is applied on both sides of the ring 46, the pressure $P_I$ is applied on both sides of the ring 48, the pressure $P_I$ is applied on both sides of the seal 62, the pressure $P_I$ is applied on both side of the bearing of the mobile member 60, there is a metal/metal contact at the level of the air outlet port 58, there is a metal/metal contact at the level of the mobile cup 78.

The absence of permanent leaks around the rings 46, 48 ensures a highly increased lifespan for the system with respect to the current state of the art.

For the valve 30 to close completely, in a specific embodiment example (see FIG. 4), three conditions have to be met:
one of the two coils 76 of the controller 74 must be passed through by a current of around 100 mA,
a minimum pressure must be applied at the proximal end 30P of the valve 30, for example of around 0.3 bar,
the electrical coils 72 of the regulation valve 64 are not passed through by a current greater than around 15 mA.

Moreover, a filter can be added upstream from the air inlet port 56 to minimise the introduction of solid pollutants in the actuator 52.

In an embodiment not shown, a linear position sensor can be connected to the first mobile blocking means 43 in order to precisely know the opening degree of the valve 30.

In another embodiment not shown, the valve 30 comprises, under the lower inner chamber 42 (along the axis X), a pressurisation chamber. This pressurisation chamber is connected, via a fluidic conduit, inside the flow path of the secondary stream 28 and is therefore at the pressure PII. The first mobile blocking means 43 moreover comprises a second piston, coaxial to the first piston, mobile in said pressurisation chamber and making it possible to isolate, in a sealed manner, the pressurisation chamber of the lower inner chamber 42. The addition of a pressurisation chamber at the outlet pressure of the valve 30 makes it possible to limit the beats of the valve 30 in the event that such an instability phenomenon was to appear.

The invention claimed is:

1. A device for bleeding an air stream for a turbine engine comprising:
a controller,
a control actuator for distributing air connected to the controller, comprising a body comprising an inner cavity connected to an air inlet port and an air outlet port, and comprising a mobile member arranged in said cavity between a position for opening the air outlet port and a position for closing the air outlet port,
a bleed valve comprising:
a first chamber intended to make the circulation of a bleed air stream possible when the valve is in an open position and to prevent the circulation of the bleed air stream when the valve is in the closed position,
an inner housing in which first mobile blocking means is moved between the open position of the valve and the closed position of the valve, and
an air outlet,
the first blocking means delimiting, in the inner housing, a second chamber and a third chamber, the second chamber, called upper inner chamber, comprising return means for returning the first blocking means into the open position of the valve, and the third chamber, called lower inner chamber, being configured so as to be fluidly connected to the control actuator in order to actuate the first blocking means against the return means, the three chambers being isolated in a sealed manner from one another by way of the first blocking means,
the device being characterized in that it comprises a regulation valve comprising:
an inner space connected to the air outlet port of the control actuator,
a leakage orifice, and
second mobile blocking means between a sealed closing position of said leakage orifice and an adjustable opening position of said leakage orifice, so as to create a determined leakage flow and to consequently adjust the pressure within the inner space.

2. The device according to claim 1, wherein the second mobile blocking means of the regulation valve is configured to be actuated by electrical means.

3. The device according to claim 2, wherein the electrical means comprise at least one electrical coil.

4. The device according to claim 3, configured so that the section of the leakage orifice is directly proportional to a current for activating the coil.

5. The device according to claim 1, wherein the inner space is connected to the air inlet port of the control actuator via a fluidic connection conduit equipped with a calibrated orifice, so as to limit the air flow of the air inlet port towards the inner space.

6. The device according to claim 1, wherein the control actuator, the electropneumatic controller and the regulation valve (64) form a single-block unit.

7. A turbine engine comprising a bleed device according to claim 1.

* * * * *